United States Patent
Rhodes

[15] 3,685,313
[45] Aug. 22, 1972

[54] DOUGH PAN ASSEMBLY FOR CONVEYING, FREEZING AND DISCHARGING SOLIDLY FROZEN DOUGH LOAVES

[72] Inventor: Herbert C. Rhodes, 400 N.E. 11th Ave., Portland, Oreg. 97232

[22] Filed: March 22, 1971

[21] Appl. No.: 126,839

[52] U.S. Cl. ..................62/345, 62/380, 18/5 A, 99/192
[51] Int. Cl. .............................................F25c 7/12
[58] Field of Search .........107/8 R, 8 C, 1 R, 3, 27 R, 107/57 R, 28, 29 R, 29 A, 58, 68, 57 A; 13/32; 18/5 A, 5 R; 53/122, 123; 25/7, 41–45, 99, 104; 99/192; 62/345, 380

[56] References Cited

UNITED STATES PATENTS 1,125,804  1/1915  Briggs..................107/57 A X
1,808,997  6/1931  Schroeder et al............107/58
3,403,639  10/1968  Hirahara et al. .......107/8 R X

*Primary Examiner*—Jordan Franklin
*Assistant Examiner*—Geo. V. Larkin
*Attorney*—L. R. Geisler

[57] ABSTRACT

A series of dough pans, carried by a pair of endless traveling chains, convey the dough through freezing chambers causing it to be frozen solid. Each pan is divided transversely into two separable portions. When the pan reaches the end of the chain course the forward portion of the pan turns downwardly out of alignment with the remaining rear portion leaving the forward end of the dough protruding from the latter. At this point a separator blade engages the bottom face of the protruding dough and, with the continued travel of the pan, the dough is thrust outwardly and downwardly over the separator blade and entirely free from the pan.

4 Claims, 6 Drawing Figures

HERBERT C. RHODES
INVENTOR.

BY
ATTY.

HERBERT C. RHODES
INVENTOR.

BY *T.R. Geisler*
ATTY.

HERBERT C. RHODES
INVENTOR.

BY *F. R. Geisler*
ATTY.

3,685,313

DOUGH PAN ASSEMBLY FOR CONVEYING, FREEZING AND DISCHARGING SOLIDLY FROZEN DOUGH LOAVES

BACKGROUND OF THE INVENTION

During the past few years, with the rapidly increasing market demand for food products in a frozen, preservable state, bread dough in solid frozen condition, so that it does not require any treatment by the ultimate purchaser and user other than a thawing and proofing followed by customary baking, has become an increasingly popular product. Customarily the frozen dough, and consequently the resulting loaf of bread, is somewhat irregular in shape due to the difficulty of removing a solidly frozen mass of bread dough from a container in which it has been placed prior to being subjected to freezing. It is well-known that when bread dough is frozen solidly while being held in firm contact with a hard surface, such as metal for example, a strong adhesion is developed by the dough with such surface Thus, the production of solidly frozen dough in pieces of desired shape and size so that when each piece is thawed, proofed and baked it will produce a loaf of bread of common rectangular shape suitable for slicing into bread slices of substantially equal size, instead of producing an elongated, oval or other irregular shaped loaf, has been faced with the difficulty of removing the frozen dough from restricting containers in a practical and feasible manner suitable for the production of regular size frozen bread loaves on a commercial scale.

The object of the present invention is to provide a continuously operating device in which solidly frozen dough loaves of uniform size and shape can be produced and from which device they can be discharged in a simple, practical manner.

SUMMARY OF THE INVENTION

The dough, in proper amounts, is placed in dough pans which are conveyed along through freezing zones. The spreading out of the dough deposited in the pans is restricted by the size and rectangular shape of the pans which are of a size and shape desired for the bread into which the dough pieces will ultimately be made by the purchasing public. Each dough pan is divided transversely into two separately mounted sections and as each pan reaches the end of its course through the freezing zone the front portion of the pan turns downwardly from the rear portion, leaving the front end of the solidly frozen dough extending forwardly from the rear portion of the pan. A separator blade then engages the bottom of the extending end of the dough and causes the dough to be pried up from the rear section of the pan as the rear section follows the course of the front section. Due to the fact that the dough is frozen to approximately rock hardness by the time the pan reaches the end of its course through the freezing zones, the dough piece is completely and cleanly separated from both sections of the dough pan, and the frozen dough loaf, in the desired shape, is then packaged and kept in below freezing temperature until final use by the purchaser.

Figure 1:
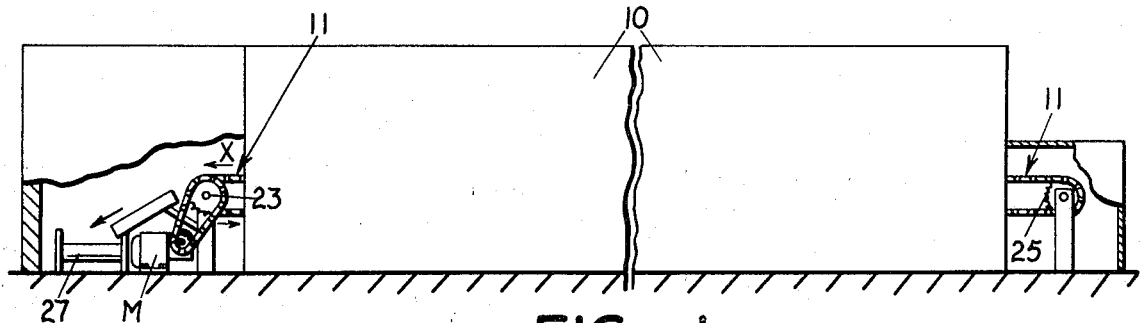
FIG. 1 is a small, more or less diagrammatic, side elevation of the assembly with portions of the entire housing broken away to show the ends of the course of the endless chains which convey the dough pans through the freezing zones to the location at which the removal of the dough from the pans takes place.

First, referring briefly to FIG. 1, the assembly is enclosed in a housing, the main portion 10 of which consists of a series of freezing chambers through which the dough loaves are moved and in which they are frozen to a solid state. The walls of the housing are provided with insulation suitable for freezing compartments. The pans for the dough, which are shown in the other figures and presently described, are carried by a pair of endless, parallel chains 11, one of which is shown in FIG. 1, which move the pans of dough from right to left, and thus in the direction indicated by the arrow X in FIG. 1.

The dough pieces, of identical and desired size, are delivered into the dough pans by well-known means (not shown) near the right hand end of the assembly (as viewed in FIG. 1) and are discharged from the pans at the opposite end of the assembly as the endless conveyor chains for the pans prepare to make their return trip. The solidly frozen dough loaves are discharged onto an endless conveyor, delivered to wrapping or packaging means (not shown) and maintained in a below-freezing temperature until reaching the ultimate customer. The novelty of the invention resides in the dough-carrying pans and the manner in which the frozen dough loaves are freely discharged therefrom.

Figure 2:
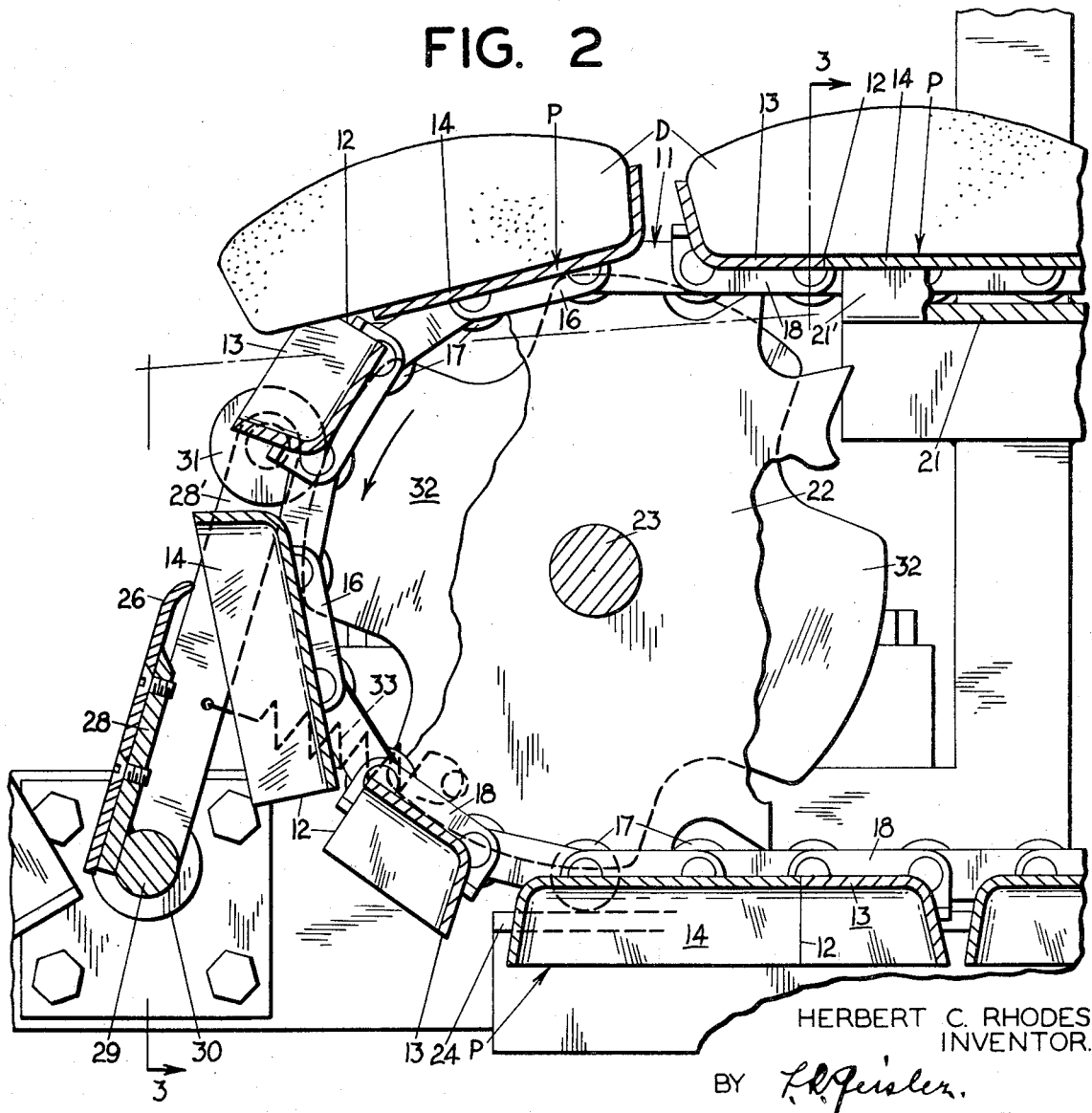
FIG. 2 is a fragmentary sectional elevation of the dough-discharging end of the device, drawn to a much larger scale, and taken on the line 2—2 in FIG. 3, with portion of the driving sprocket wheel for one of the pair of conveyor chains for the dough pans broken away for clarity.
Figure 3:
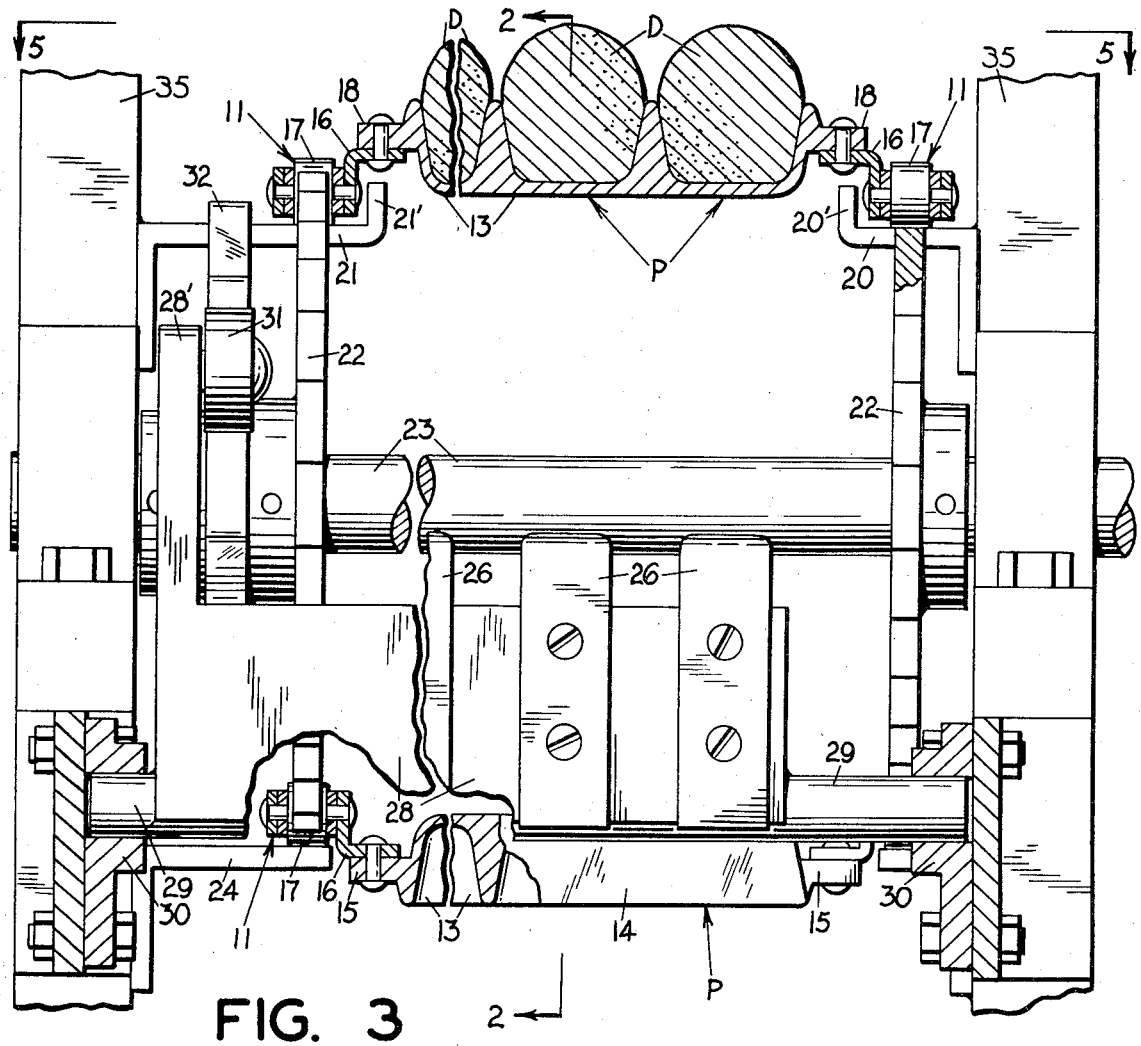
FIG. 3 is a foreshortened section taken on the line indicated at 3—3 in FIG. 2, with certain parts broken away for clarity and with the driving means for the assembly omitted as well as the external housing.
Figure 5:
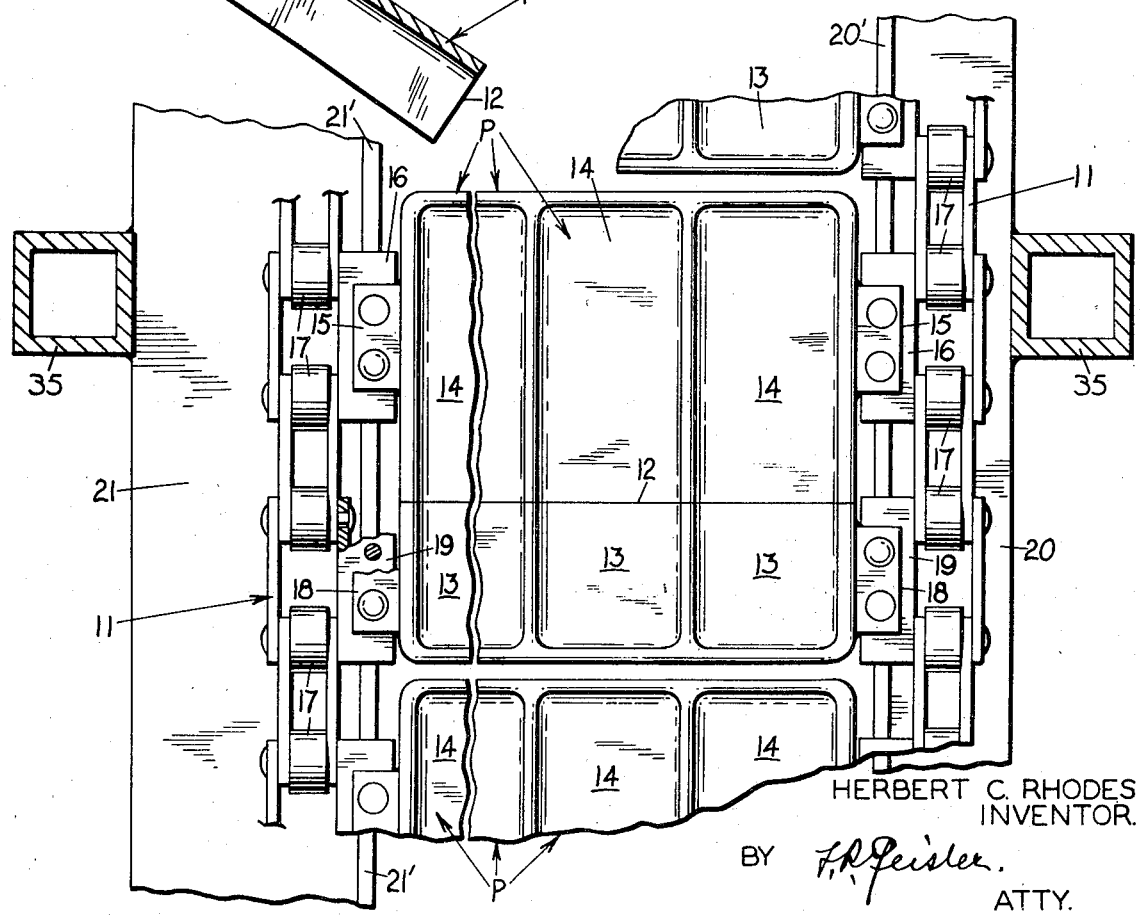
FIG. 5 is a foreshortened partial top plan view of a cross row of the traveling bread pans, the dough being omitted from the pans for clarity, the view being taken on line 5—5 of FIG. 3.

Referring now to FIGS. 2, 3 and 5, each dough pan P comprises a rectangularly-shaped open pan entirely severe by a transverse cut 12 into a forward portion 13 and a rear portion 14. While a single pan comprising front and rear portions could be mounted on a pair of endless conveying chains, thus providing the assembly with a series of single pans moved along through the freezing compartments to the discharging end section of the assembly, it is more practical for commercial scale operation to have a plurality of pans formed into an integral, side-by-side arrangement as illustrated in FIG. 5. Thus, a plurality of pans, arranged side-by-side, are cast as a single block of pans and then the block of pans is severed by a transverse cut 12 forming one block of integral rear pan portions 14 and a registering block of forward pan portions 13.

The two outer edges of the block of rear pan portions 14 are each formed with a flat outwardly extending ear 15 (FIG. 5), each of which ears is secured on the top flange of an angle iron member 16 (see also FIG. 3) which forms the inside link between a pair of successive rollers 17 of the corresponding adjacent conveyor chain 11. Similarly, the two outer edges of the block of forward pan portions 13 each carry an integral ear 18 which is secured on a similar angle iron member 19 constituting the inner connecting link between the next successive pair of chain rollers, as shown in FIG. 5.

The rollers of the pair of endless conveyor chains 11, in the top course of the chains, move along a pair of horizontal tracks 20 and 21 (FIGS. 5 and 3), which tracks are welded to upright support members 35, two of which are shown in FIG. 5. As apparent from FIG. 5, the mounting of the forward and rear blocks of dough pan portions 13 and 14 and the arrangement of the linkage in the pair of endless conveyor chains 11 is such that when the chains move along on the horizontal tracks 20 and 21 the forward and rear blocks of each group will be in contact and registration with each other, thus forming complete pan units for receiving and conveying the pieces of dough.

Figure 6:
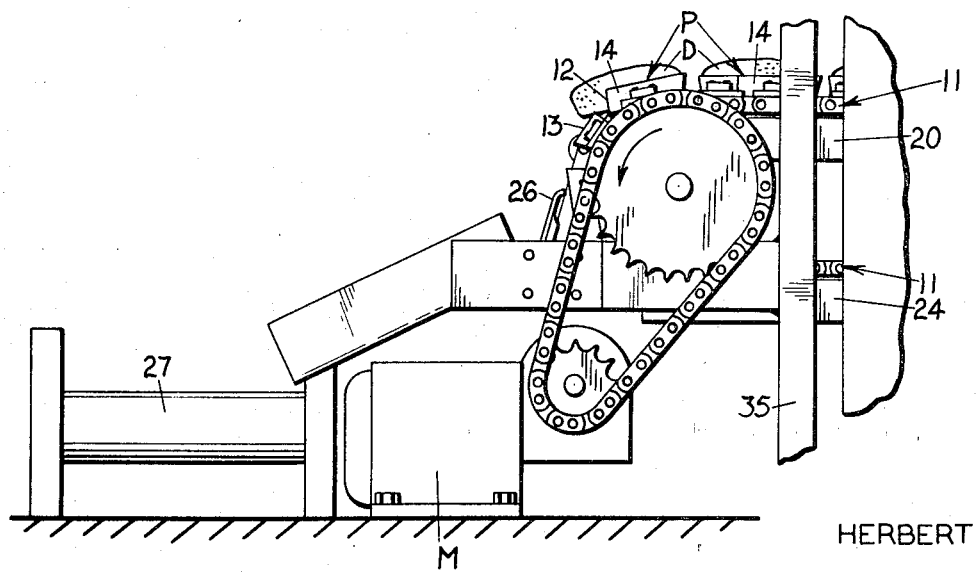
FIG. 6 is a fragmentary elevation of the forward or discharging end of the assembly with the housing wall removed, corresponding to the portion at the left in FIG. 1, but drawn to a larger scale for clarity.

At the forward or left end of their courses (as viewed in FIGS. 1, 3 and 6) the conveyor chains 11 pass from their tracks 20 and 21 onto a pair of sprocket wheels 22 secured on a driven shaft 23. The shaft 23 is driven through sprocket and chain connection with an operating motor M and suitable gear reduction. On their return lower course the conveyor chains, with their blocks of pan portions, ride along similar tracks in inverted position, one of which tracks is indicated in part at 24 in FIG. 2, and then the chains move up over idler sprockets, one of which is indicated at 25 in FIG. 1, and proceed onto the top tracks 20 and 21.

As the endless moving conveyor chains 11 with their composite blocks of pans P start their travel along the top course (from right to left as viewed in the figures), a piece of dough of proper, predetermined size is deposited in each pan unit. This is accomplished by dough-distributing means which is not shown in the drawings and which need not be described since it is well-known and does not form part of the present invention. The individual pieces of dough D, when deposited in the composite pans, spread out to the rectangular confining shape of the pans, and, as they are moved along through the freezing chambers of the assembly, are frozen into solid, hard blocks of dough before reaching the end of the top course of the chains, as previously indicated. Then, as the conveyor chains move downwardly over their respective sprockets 22 (in counter-clockwise direction as viewed in FIG. 2), the forward portions 13 in each composite pan group move out of registration and alignment with the rear portions, separating themselves forcibly from the solid dough loaves and leaving the forward ends of the latter protruding from the rear portions of the pan group.

Figure 4:
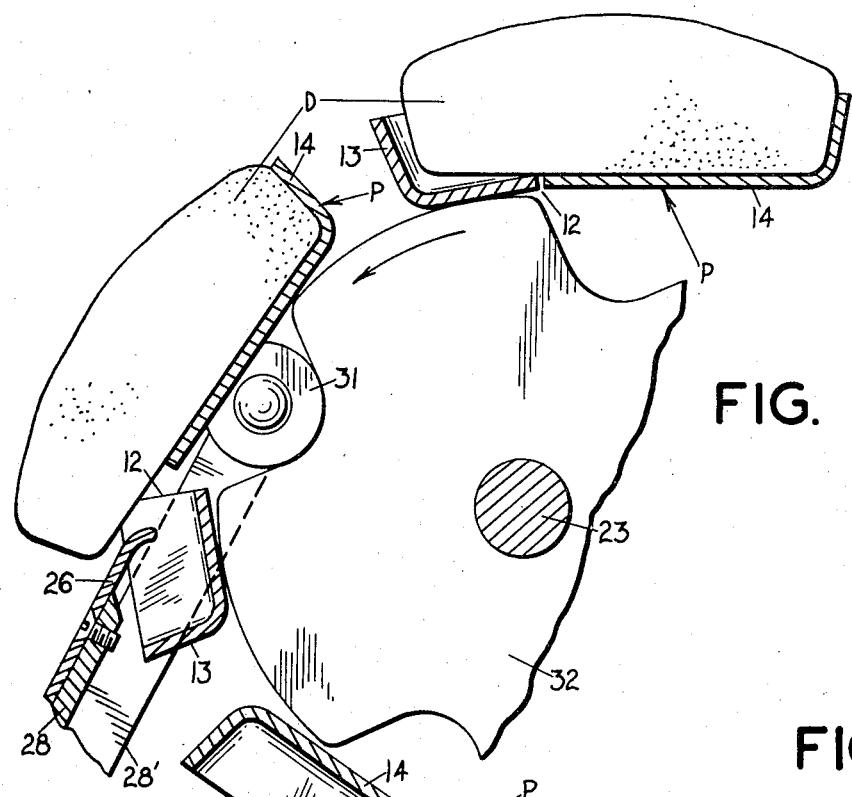
FIG. 4 is a fragmentary sectional elevation, similar in part to FIG. 2, but with the conveyor chain and drive sprocket for the same, which are shown in FIG. 2, entirely omitted for clarity, and with the frozen bread loaves shown in a further advanced position.

As the protruding ends of the solid dough loaves, extending forwardly from the rear portions of their respective pans, continue their travel, each dough loaf moves out onto the forward end of a separator blade 26 (FIGS. 2, 3 and 4), and the continued movement of each dough piece down over its separator blade causes it to be lifted forcibly from the rear portion of its pan and thus to become entirely separated from the pan while the rear portion of the pan follows the corresponding forward portion of the pan with the travel of the conveyor chains around the drive sprockets 22. The removed dough piece then slides down the separator blade onto a conveyor 27 (FIGS. 1 and 6) which carries the frozen dough loaves to the wrapping or packing assembly (not shown) and the loaves then continue to be kept in freezing temperature until dispensed to the final purchaser.

The separator blades 26 are so mounted that their dough-engaging ends are automatically swung a short distance into engaging position with the ends of the dough (in clockwise direction as viewed in FIG. 2) and are then moved in opposite direction correspondingly in order to pry the dough from the rear portion of the pan and to provide ample clearance for the rear portion of the pan from which the engaged dough piece is removed.

In the preferred arrangement as shown in the drawings, in which a plurality of pans are arranged in side-by-side position, a corresponding number of registering separator blades 26 (FIGS. 2, 3 and 4) are mounted on a transversely extending support plate 28. The bottom of this support plate is secured to a hinge shaft 29, the ends of which shaft are supported in suitable bearings 30, 30 secured in each side of the outer housing structure. At one end the hinged support plate 28 has an upwardly extending arm 28' located beyond the outside of the adjacent conveyor chain and sprocket at that side of the assembly. A roller 31, acting as a cam follower, is mounted at the top end of the extending arm 28' and rides on the periphery of a grooved wheel 32 which is secured on the driven shaft 23 and accordingly which rotates in unison with the chain sprocket wheels 22. The roller 31 on the arm 28' is held into contact with the periphery of the grooved wheel 32 by a spring 33 (shown in broken outline in FIG. 2), having one end connected to the arm 28' and the other end connected to a stationary frame member in the device. The periphery of the wheel 32 is formed with identical, equally spaced grooves which are so spaced that, as the shaft 23 is rotated, and with it the sprocket wheels 22, driving the conveyor chains 11 for the dough pans, the grooves on the wheel 32 will be engaged by the roller 31 each time the forward portions 13 of the block of pans turn downwardly away from the companion rear portions 14, leaving the front ends of the frozen dough loaves protruding from the rear portions. As apparent, the roller 31 is pulled into the grooves of the rotating wheel 32 by the pull of the spring 33. Then, as the roller 31 is moved outwardly from each groove by the rotation of the wheel 32 the separator blades will exert an outward thrust against the bottoms of the engaged dough loaves, while the dough loaves move down over the intercepting separator blades, until the loaves are freed entirely from the rear portions of the pans and the rear portions of the emptied pans continue their course with the conveyor chains.

Thus, even though the solidly frozen dough loaves have a strong adhesion to the bottom and side walls of their respective pans, the separation of the forward and rear portions of the pans and the subsequent thrust of the separator blades, cause first the forward ends and then the remaining portions of the frozen loaves to be forcibly removed. Such complete removal would, of course, not be possible if the dough were not solidly frozen.

It is important in the carrying out of the invention that the transverse cut through the dough pans be made not further than halfway back from the forward ends of the pans so that the downward turning of the forward portions of the pans will always leave the loaves adhering to the rear portions of the pans and thus with the front ends of the loaves protruding from the rear portions of the pans in position for engagement by the separator blades. As previously mentioned, due to the solid frozen condition of the loaves at the time of their separation from the pan portions, the pans are left entirely free from any dough fragments.

I claim:

1. In a device of the character described for receiving equal masses of bread dough and for conveying and freezing the dough and discharging frozen dough loaves formed therefrom, a pair of endless drive conveyor chains and two pairs of sprockets, said chains passing up over the first pair of sprockets at the intake end of the device and down over the second pair of sprockets in the outlet end of the device, means for driving said chains, a pair of tracks for the top courses of said chains extending between said pairs of sprockets, a freezing zone between said intake end and said outlet end, said chains passing through said freezing zone, a series of identical dough pans carried by said chains, each of said pans divided transversely into separable front and rear portions, mounting means for said front portions of said pans on said chains, separate mounting means for said rear portions of said pans on said chains, said mounting means so positioned and arranged that the front portion of each pan will be fully in contact and in alignment with the corresponding rear portion of the pan when the pan is moved through said freezing zone with the travel of said chains along said tracks, but said front portion will separate from said rear portion and move downwardly therefrom as said chains pass down around the sprockets in said outlet end of the device, thereby leaving the forward end of the dough loaf in the pan protruding from said rear portion of the pan, and an interceptor blade extending into the path of the protruding forward end of the dough loaf for prying the dough loaf from said rear portion of the pan as said rear portion follows the forward portion of said pan with said chains, whereby the dough loaf will be entirely freed from the pan and delivered down said interceptor blade in the discharging end of the device.

2. The combination set forth in claim 1 but with a series of integral blocks of identical pans carried by said chains, each of said blocks of pans divided transversely into separable front and rear portions, mounting means for said front portion of each block on said chains, separate mounting means for the rear portion of each block on said chains, said mounting means so positioned and arranged that said front portion of each block will be fully in contact and alignment with the corresponding rear portion of the block when the block of pans moves through said freezing zone with the travel of said chains along said tracks, but said front portion of each block will separate from said rear portion and move downwardly therefrom as said chains pass down around the sprockets in the outlet end of the device and thereby leave the forward ends of the dough loaves in said block pans protruding from the rear portion of the block, and a plurality of interceptor blades extending into the paths of the protruding ends of the dough loaves respectively for prying the dough loaves from the rear portion of said block of pans as said rear portion follows said forward portion with said chains.

3. The combination set forth in claim 2 with said front portion of each block of said pans shorter than the corresponding rear portion.

4. The combination set forth in claim 3 with means connected with the movement of said chains for moving said interceptor blades to cause said interceptor blades to move outwardly when said interceptor blades engage the forward ends of the dough loaves protruding from the rear portion of said block of pans.

* * * * *